Jan. 12, 1965

W. STEVENS 3,165,237

MATERIAL DISPENSING APPARATUS

Filed Dec. 20, 1963

INVENTOR
Wellington Stevens

BY Mason, Fenwick & Lawrence
ATTORNEYS

Jan. 12, 1965 W. STEVENS 3,165,237
MATERIAL DISPENSING APPARATUS
Filed Dec. 20, 1963 5 Sheets-Sheet 5

Fig. 8

INVENTOR
WELLINGTON STEVENS
BY
Mason, Fenwick & Lawrence
ATTORNEYS

United States Patent Office 3,165,237
Patented Jan. 12, 1965

3,165,237
MATERIAL DISPENSING APPARATUS
Wellington Stevens, P.O. Box 877, Vero Beach, Fla.
Filed Dec. 20, 1963, Ser. No. 332,997
28 Claims. (Cl. 222—56)

This invention relates to an apparatus for dispensing comminuted materials and the like, and more particularly to an automotive vehicle having means for dispensing uninterruptedly a precise predetermined amount of the material onto a roadbed or other similar surface. This application is a continuation in part of my copending application Serial Number 226,679, filed September 26, 1962, now abandoned.

In the construction of roadways and other similar projects, frequently it is desirable to provide a layer of dry comminuted material having a precise predetermined width and thickness. This particularly is desirous in the soil-cement method of road construction wherein it is essential that a precise predetermined amount of dry cement be dispensed on a layer of pulverized soil. In such a method, the amount of dry cement spread upon the soil for subsequent mixing, damping and compacting depends upon the character of the soil. Tests along a proposed roadway may indicate variations in the character of the soil which accordingly would require corresponding variations of the amount of cement spread on the soil to provide the desired proportion of cement and soil mixture.

In the prior art, there are various types of dispensing vehicles for spreading dry cement onto such roadbeds. However, the performance of such vehicles in dispensing precise predetermined amounts of material has been found to be unsatisfactory in that the rate of the amount of material dispensed cannot be effectively controlled. This ineffective control primarily is attributed to the fact that normally the control of the rate of material dispensing, the assurance of an uninterrupted flow of material to the dispensing means and the compensation for inherent variations in the speed of the vehicle are dependent principally upon the skill and judgment of the vehicle operator, which is not always effectively reliable.

Accordingly, it is the principal object of this invention to provide an improved automotive vehicle for dispensing comminuted materials and the like.

Another object of this invention is to provide an improved automotive vehicle for dispensing precise predetermined amounts of comminuted materials and the like.

A further object of this invention is to provide an improved automotive vehicle for dispensing precise predetermined amounts of comminuted materials and the like which is readily maneuverable.

A still further object of this invention is to provide an improved automotive vehicle for dispensing comminuted materials and the like in precise predetermined amounts having a novel means for assuring a continuous supply of comminuted material to the dispensing means.

Another object of this invention is to provide an improved automotive vehicle for dispensing comminuted materials and the like wherein a precise predetermined amount of the material is dispensed notwithstanding variations in the ground speed of the vehicle.

A further object of this invention is to provide a novel material handling apparatus suitable for use with a vehicle for dispensing comminuted materials.

A still further object of this invention is to provide a novel assembly for supplying material to a container responsive to load conditions within the container.

Another object of this invention is to provide a novel electrical control system for selectively operating electrical actuating means of a material supply means for a container to maintain a supply of material within the container between predetermined levels.

A further object of this invention is to provide an improved automotive vehicle having means for dispensing precise predetermined amounts of comminuted material in strips, wherein means are provided to vary the width of the strip of dispensed material.

A still further object of this invention is to provide an improved automotive vehicle for dispensing precise predetermined amounts of dry comminuted materials having means for conditioning the material prior to delivery of the same to the dispensing means.

Other objects and advantages of the present invention will become apparent to those skilled in the art, from the following description when read in conjunction with the accompanying drawings, wherein.

Briefly described, the present invention is concerned with an improved automotive vehicle for dispensing comminuted materials comprising a frame mounted on wheels, power means mounted on the vehicle frame to drive the vehicle, a receiving bin mounted on the front end of the frame, a dispensing bin mounted on the rear end of the frame, conveyor means for conveying the material from the receiving bin to the dispensing bin and means for dispensing the material onto a roadbed. The invention further contemplates a novel automatic control means adapted to be operatively associated with the dispensing bin and the conveyor means which is operable to sense loading conditions in the dispensing bin and in accordance therewith to operate the conveyor means or other supply means to assure a desired loading of the material in the dispensing bin. Additional separate means also may be provided to automatically control the operation of the dispensing means so that a constant and precise predetermined amount of material is dispensed onto the roadbed irrespective of the ground speed of the vehicle, and also to adjust the width of the strip of the dispensed material on the roadbed.

Referring to FIGURES 1 through 7 of the drawings illustrating a first embodiment of the invention, there is shown a vehicle comprising a frame 10 mounted on wheels 11. Also mounted on the frame 10, preferably toward the forward end of the vehicle is an engine 12 which provides drive through a rear power take-off shaft 13, a transmission 14 and drive transmitting shafts 15 to each of the wheels 11. Each wheel is thus provided with individual drive means which are controlled from the operator's control station. The vehicle also has a conventional four wheel steering system which is operated from a steering unit 16, suitably mounted on the vehicle conveniently accessible to the operator.

Mounted on the front end of the vehicle and at a suitable height so as to accommodate a material feeding means, such as a conventional dump truck, is a material receiving bin 17 which preferably extends transversely the entire width of the vehicle. The receiving bin can be of any suitable shape and construction. At the opposite end of the vehicle, there is mounted a material dispensing bin 18 which likewise extends across at least the entire width of the vehicle. Extending from the bottom of the receiving bin for receiving material through openings 19 and 20, to the top of the dispensing bin are a pair of laterally spaced belt conveyors 21 and 22 which are mounted on forwardly and rearwardly disposed drive drums 23 and 24, and are housed along the entire length thereof in suitable housings 25 and 26.

The engine 12 is provided with a rearwardly projecting auxiliary power take-off shaft 27 which transmits drive through shaft 28, shaft coupling 29, shaft 30, transmission 31 and then through shafts 32 and 33 and air actuated clutches 34 and 35 to the belt conveyor drums 23. The clutches 34 and 35 are adapted to selectively engage and disengage to transmit drive to the belt conveyor drums to operate the belt conveyors. The clutches are operated by either a manual or automatic electric-pneumatic control system, as will hereinafter be described.

Figures 4, 5, 6:
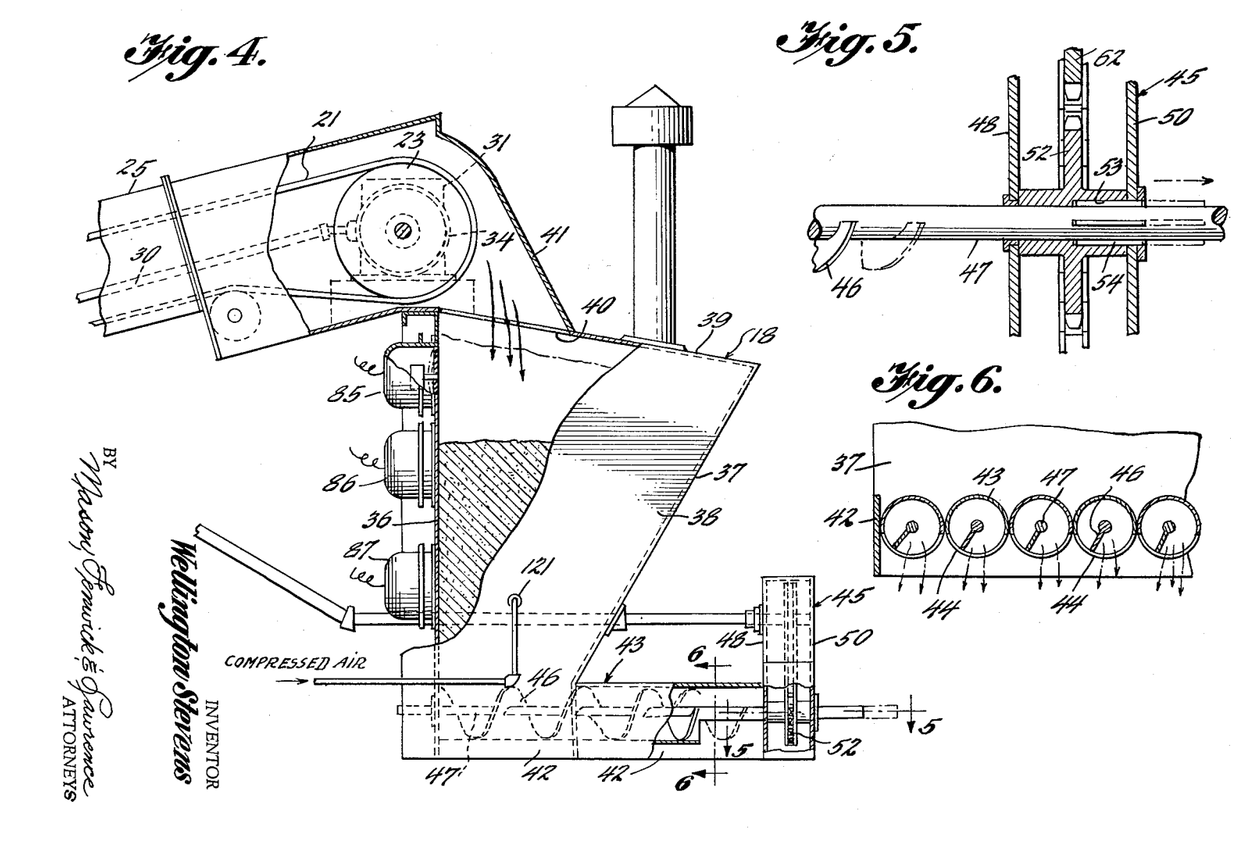
FIGURE 4 is an enlarged fragmentary view of the dispensing end of the first embodiment of the invention, having portions thereof broken away, illustrating in greater detail the various components thereof.
FIGURE 5 is a cross-sectional view taken along lines 5—5 of FIGURE 4.
FIGURE 6 is a cross-sectional view taken along lines 6—6 of FIGURE 4.

As best illustrated in FIGURE 4, the dispensing bin 18 comprises a vertical front wall 36, a forwardly and downwardly sloped rear wall 37, side walls 38 and a rearwardly declining top wall 39 having openings 40 adjacent the rear end of the belt conveyors for receiving the material therethrough. The openings 40 are protected by a pair of material trajectory hoods 41, which curve downwardly from the rear ends of the conveyor housings 25 and 26 to the top wall 39 of the dispensing bins.

Figure 3:
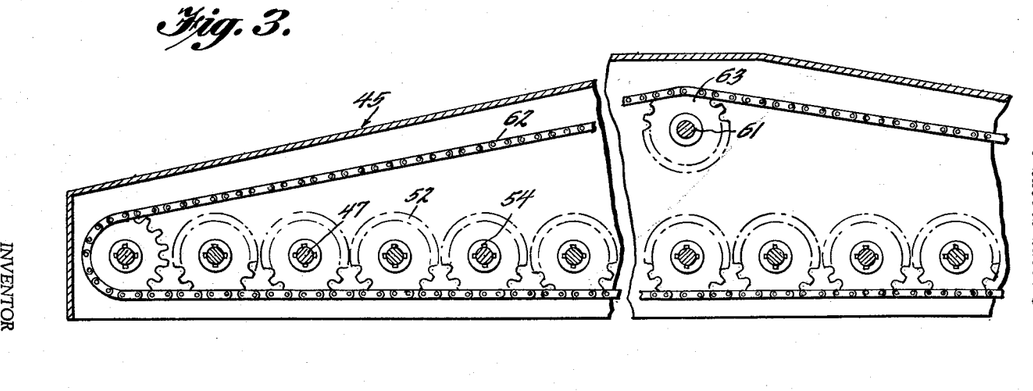
FIGURE 3 is an enlarged cross-sectional view taken along lines 3—3 of FIGURE 1, having portions thereof broken away.

Projecting rearwardly from the bottom of the dispensing bin 18 and disposed between lower side panels 42 is a plurality of tubular helical screw housings 43, communicating at the forward ends thereof with the dispensing bin 18 for receiving a supply of material and having bottom openings 44 at the rearward ends thereof for discharging the material. Mounted on the rear end of the helical screw housings 43 and the lower side panels 42 is a sprocket chain housing 45, as best shown in FIGURE 3. Disposed in each of the tubular housings 43 is a helical dispensing screw 46 having a shaft 47 journaled at the forward end thereof in the front wall 36 of the dispensing bin and at the rearward end thereof in front wall 48 and rear wall 50 of the sprocket chain housing 45.

Referring to FIGURES 4 and 5, there is mounted on each helical screw shaft a sprocket wheel 52 having axially projecting hub portions for spacing the sprocket wheel between the front and rear walls 48 and 50 of the sprocket housing. It will be noted that the axial bores in the hub portions of the sprocket wheels are provided with a plurality of grooves 53 which conform with and are adapted to receive splines 54 formed on the rearward end of the shaft. It will be appreciated that the lengths of the helical screw shafts are sufficient so that the shafts may be adjusted axially into and out of operative engagement through the splined connection with the sprocket wheels.

It is an important feature of the present invention that the helical screws 46 dispense a precise predetermined amount of comminuted material regardless of the speed of the vehicle. This is provided by means of a variable speed drive 55 which also is mounted in the vehicle frame. The variable speed drive 55 can be of any suitable type, although a Link-Belt P.I.V. variable speed drive as disclosed in one or more of U.S. Patents 1,966,831, 2,266,687, 2,329,911 and 2,330,058 having an infinitely variable speed control with positive power transmission is preferred. Referring specifically to the drawings, input shaft 56 transmits drive from the main transmission 14 to the variable speed drive 55. Drive is then transmitted from the variable speed drive through output shaft 57, universal coupling 58, shaft 59, gear reduction unit 60 and shaft 61, which passes through the dispensing bin and which is journaled in the walls of the bin and the front wall of the sprocket chain housing. A sprocket chain 62 transmits drive finally from a sprocket wheel 63 mounted on the shaft 61 to the helical screw shafts 47 through the sprocket wheels 52.

It will be appreciated that the drive of helical dispensing screws 46 is coordinated with the speed of the vehicle by means of the dispensing screws and the individual wheel drives being operatively interconnected through the main transmission 14. The variable speed ratios between the wheel drives and the dispensing screws are provided by adjusting the gear ratio between the input shaft 56 and output shaft 57 by means of a control shaft 64. The ratio settings of the variable speed drive 55 are controlled by means of a remote hand wheel 65, which is located at the operator's station. The hand wheel 65 is operatively connected to the control shaft by means of a sprocket chain 66, and also is provided with an indicator 67 which is calibrated to indicate pounds per square yard. It is to be understood that although a remote hand wheel control system is shown in the drawings and described herein for controlling the ratio settings of the variable speed unit, this is by way of illustration and not of limitation. Any other suitable ratio setting control means also can be used.

Another important feature of this invention is the means provided for assuring a sufficient supply of material in the dispensing bin at all times. This includes a fluid system operated either by a manual or automatic electrical control system.

Figure 7:
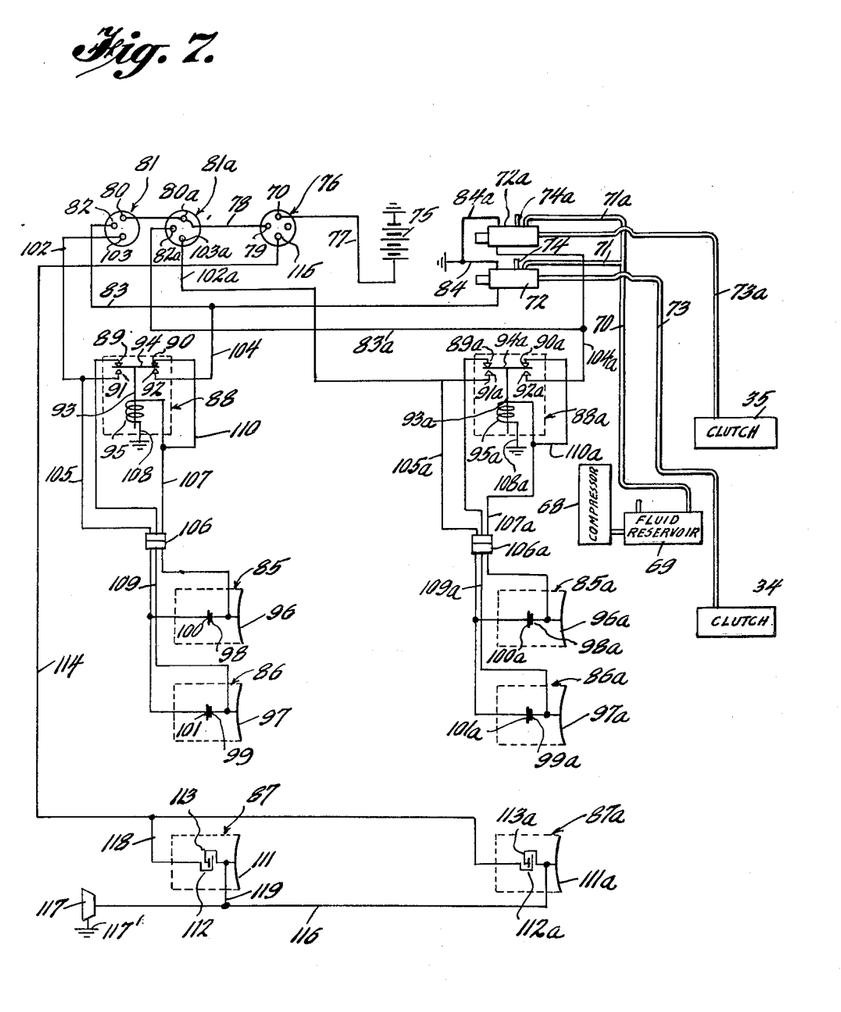
FIGURE 7 is a diagrammatic schematic view of the components of the electrical-pneumatic control means for the conveyor means of the present invention.

The pneumatic system disclosed in FIGURE 7 by way of illustration comprises an air compressor 68, a fluid reservoir 69 which supplies the working fluid under pressure through lines 70, 71 and 71a, solenoid actuated valves 72 and 72a and lines 73 and 73a to clutches 34 and 35. Solenoid actuated valves 72 and 72a may be of any suitable type, although sliding piston type valves are preferred. The valves also are provided with exhaust lines 74 and 74a.

Referring further to FIGURE 7, there is shown schematically the manual and automatic electrical systems for selectively controlling the operation of solenoid valves 72 and 72a. A battery 75 supplies current for both the manual and automatic systems through an ignition switch 76, such as a lock type switch used on automobiles, the battery being grounded to the vehicle frame, or engine, and the positive side of the battery being connected to pole 70 of switch 76 by means of a cable 77. Lead wire 78 connects pole 79 of switch 76 with poles 80 and 80a of selector switches 81 and 81a. The selector switches are connected from poles 82 and 82a through lead wires 83 and 83a, respectively, to the solenoid coils of solenoid valves 72 and 72a. The manual control system is completed through the solenoid coils and ground leads 84 and 84a.

Figure 1:
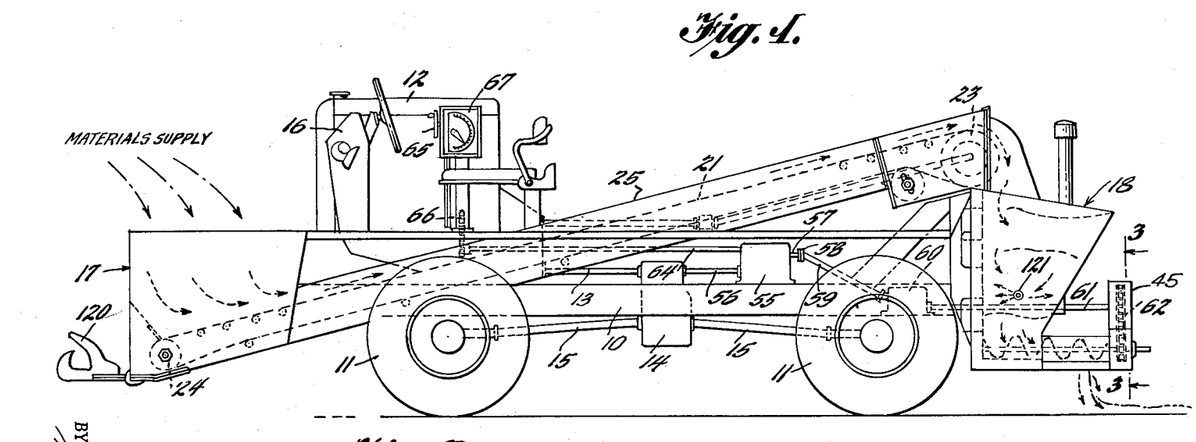
FIGURE 1 is a side view of a first embodiment of the invention.
Figure 2:
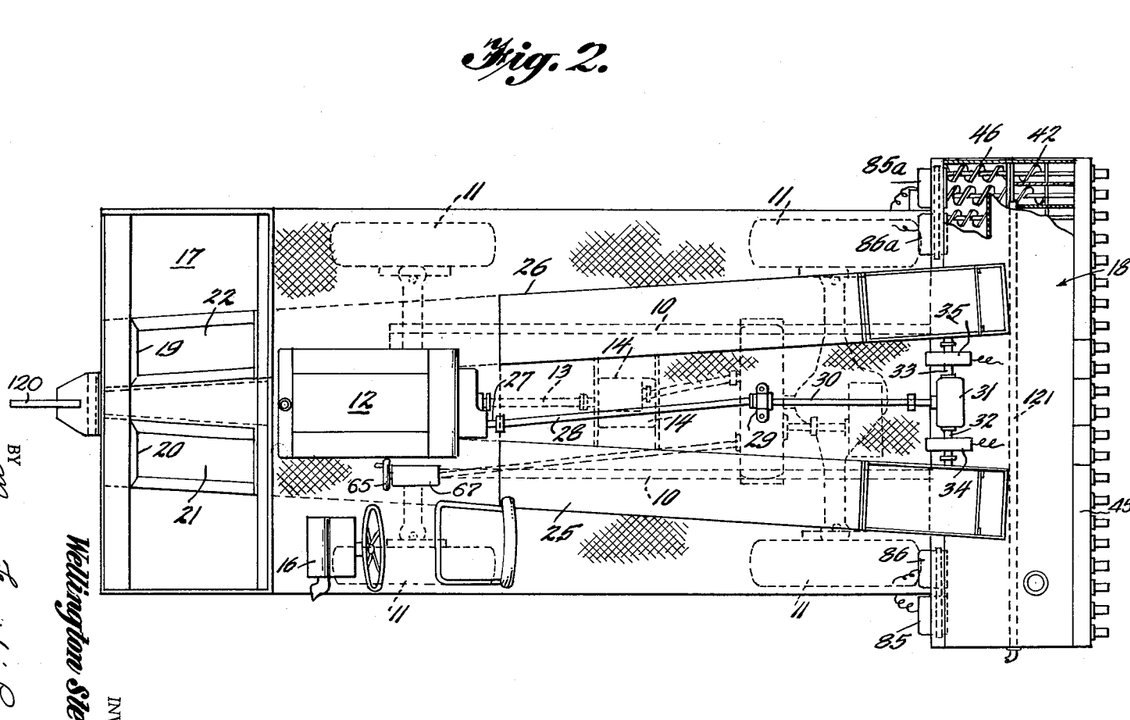
FIGURE 2 is a top plan view of the embodiment shown in FIGURE 1.

The automatic control system utilizes a dual set of sensing devices mounted at predetermined levels each at opposite ends of the front wall of the dispensing bin at best shown in FIGURES 1, 2 and 4. The sensing devices may be of any suitable type, although pressure sensing devices of the type utilizing a flexible diaphragm are preferred. Specifically, as shown in the drawings, the lefthand side of the dispensing bin is provided with an upper pressure switch 85 and a lower pressure switch 86. Similarly, the right-hand side is provided with an upper pressure switch 85a and a lower pressure switch 86a. Each side of the dispensing bin is also provided with pressure switches 87 and 87a, respectively, for purposes as will hereinafter be described.

Each set of pressure switches can be actuated independently and each switch thereof in sequence, to selectively operate respective solenoid valves by means of interrupter relays 88 and 88a. Interrupter relay 88 comprises a first pair of contacts 89 and 90, a second pair of contacts 91 and 92, an armature 93 having a bridging element 94, and induction coil 95. Pressure switches 85 and 86, respectively, comprise flexible diaphragms 96 and 97, movable contacts 98 and 99 which are fixed to diaphragms 96 and 97 and stationary contacts 100 and 101. Relay 88a and pressure switches 85a and 86a are similar to relay 88 and pressure switches 85 and 86, respectively.

Referring to that portion of the automatic control system responsive to load conditions on the left-hand side of the dispensing bin, lead wire 102 connects pole 103 of selector switch 81 with contact 91 of relay 88. Contact 92 is connected to lead wire 83 by means of lead wire 104 to complete the automatic current supply circuit to solenoid valve 72. The interrupter circuit associated with relay 88 includes pressure switches 85 and 86. As shown, lead wire 102 is connected by means of lead wire 105 through disconnect plug 106 with stationary contact 100 of switch 85 and stationary contact 101 of switch 86. Movable contact 98 is connected by lead wire 107 through plug 106 to coil 95 having the other terminal thereof grounded as at 108 to complete the interrupter circuit. Movable contact 99 of switch 86 is connected by means of lead wire 109 through disconnect plug 106 to contact 89 of relay 88. The holding circuit is completed by means of lead wire 110, which connects contact 90 with coil 95. The current supply, interrupter and holding circuits of that portion of the automatic control system responsive to load conditions on the right-hand side of the dispensing bin are substantially similar to those circuits hereinbefore described.

The present invention also provides a warning system, including pressure switches 87 and 87a which are mounted on lower opposite ends of the front wall of the dispensing bin. Similar to the aforementioned pressure switches, switch 87, which is identical to switch 87a, is provided with a flexible diaphragm 111, a stationary contact 112 and a movable contact 113. Lead wire 114 connects pole 115 of ignition switch 76 to stationary contact 112a of switch 87a. Movable contact 113a is connected by means of lead wire 116 to a horn 117 or other suitable indicator which is grounded as at 117'. Pressure switch 87 is connected in parallel across lead wires 114 and 116 wherein lead wire 118 connects lead wire 114 to stationary contact 112 and lead wire 119 connects movable contact 113 to lead wire 116.

The schematic illustrated in FIGURE 7 shows the condition of the electrical system when the dispensing bin is loaded with material at least above the level of pressure switches 85 and 85a. It will be noted that under such conditions all of the flexible diaphragms of the pressure switches will be flexed inwardly as a result of the pressure provided by the lateral force of the weight of the material in the bin. Accordingly, the contacts of switches 85, 85a, 86 and 86a will be closed and the contacts in switches 87 and 87a will be open. It further will be noted that coils 95 and 95a when energized, as shown, attract their respective armatures 93 and 93a upwardly, causing bridging elements 94 and 94a to bridge contacts 89 and 90 and 89a and 90a. With the electrical system in the condition as shown, no current is supplied to the solenoid valves, thus preventing working fluid from being supplied to the clutches.

In operation, material is supplied to the receiving bin by a dump truck or other suitable vehicle which precedes the dispensing vehicle. The dispensing vehicle can be towed by the supply truck through a connector means 120, can travel under its own power while coupled to the truck with the truck travelling under its own power at a comparable speed, or the dispensing vehicle can provide the motive power for both the truck and itself while coupled to the truck and with the truck either out of gear or in a creeping gear.

At the beginning of the operation of the automatic electrical control system when the level of material in the dispensing bin is below the level of pressure switches 86 and 86a and also at any subsequent time when such a condition exists, immediately the current supply circuit is energized and the interrupter and holding circuits are de-energized.

With reference to FIGURE 7, and particularly that portion of the automatic electrical control system which is responsive to load conditions in the left-hand side of the dispensing bin, current immediately flows from the battery 75, lead wire 77, selector switches 81a and 81, lead wire 102, bridging element 94 which normally bridges relay contacts 91 and 92 when the relay coil 95 is de-energized, and lead wire 83 to actuate solenoid valve 72. Upon actuation of solenoid valve 72, fluid under pressure passes through conduit 73 to cause clutch 34 to engage. Upon engagement of clutch 34, drive is transmitted to the left-hand conveyor 25 and material in the receiving bin immediately is conveyed to the dispensing bin.

As the level of material in the dispensing bin begins to rise and eventually reach a level above pressure switch 86, the contacts thereof close but no current flows in the holding circuit due to the open contacts 89 and 90. Eventually as the material rises above the level of pressure switch 85 the contacts thereof close and current flows in the interrupter circuit thus energizing relay coil 95 causing the armature 93 to move upwardly to open the supply circuit across relay contacts 91 and 92 and close the holding circuit across relay contacts 89 and 90. As soon as the supply circuit is opened, the solenoid valve 72 becomes deactivated. Immediately the clutch 34 becomes disengaged and the belt conveyor stops.

Assuming that the dispensing vehicle is to travel under its own power, drive is transmitted from the power unit 12 to the transmission 14 by means of drive transmitting shaft 13. The transmission 14 distributes the drive to each of the wheels 11 by means of drive transmitting shafts 15. Each of the wheels 11 is driven by a separate drive means, as indicated. Output shaft 56 of transmission 14, being geared to the wheel drives transmits drive from the transmission 14 to the variable speed drive 55. Drive is then transmitted from the variable speed drive 55 through output shaft 57, coupling 58, drive transmitting shaft 59, through a suitable gear reduction unit 60, drive transmitting shaft 61, through a sprocket wheel 63 and a sprocket chain 6 to sprocket wheels 5 and thence by means of spline connections to helical screw shafts 47 to rotate the same. Prior to the operation of the vehicle, the gear ratio setting of the variable speed drive 55 is set by means of hand wheel 65 through sprocket chain 66 and control shaft 64. The predetermined gear ratio setting is displaced on the indicator 67 and can be adjusted to correspond with the desired amount of material to be dispensed.

As the dispensing vehicle begins to travel, the drive of the helical screw shafts 47 is coordinated by means of its direct gearing to the drive shafts of the wheels. Any variation in the travel of the vehicle immediately is transmitted to the helical screw shafts so that the rotation thereof, and consequently, the dispensing of the material is coordinated so as to provide a constant dispensing of the material and also a uniform layer of dispensed material on the roadbed. It will be appreciated that the amount of material to be dispensed can be controlled by simple adjustment of the hand wheel 65 to provide a wide range of dispensing rates.

With the dispensing bin loaded with material at a level above pressure switches 85 and 85a, current flows from the battery 75 through cable 77, lead wire 78, selector switches 81 and 81a, lead wires 102 and 102a, lead wires 105 and 105a through disconnect plugs 106 and 106a through the closed contacts of pressure switches 85 and 85a, lead wires 107 and 107a, disconnect plugs 106 and 106a, and thence to relay coils 95, 95a and thence to ground through grounded leads 108 and 108a to complete the interrupter circuits. With the interrupter circuits thus energized, relay coils 95 and 95a attract the armatures 93 and 93a upwardly so that bridging elements 94 and 94a bridge relay contacts 89 and 90 in relay 88 and contacts 89a and 90a in relay 88a.

Simultaneously, current also flows from lead wires 105 and 105a, through closed contacts in pressure switches 86 and 86a, through lead wires 109 and 109a, disconnect plugs 106 and 106a, across the closed contacts in relays 88 and 88a and thence by means of lead wires 110 and 110a to the relay coils 95 and 95a to complete the hold circuits.

When the level of material in the dispensing bin falls below the level of the upper pressure switches 85 and 85a, the flexible diaphragms 96 and 96a flex outwardly, thus opening their respective contacts, causing the interrupter circuits to be de-energized. However, the relay solenoids 95 and 95a remain energized by means of the hold circuits. Eventually, as the material falls below the level of the lower pressure switches 86 and 86a, flexible diaphragms 97 and 97a flex outwardly, opening the contacts in pressure switches 86 and 86a, thus causing the hold circuit to become de-energized, and consequently, the relay coils 95 and 95a become de-energized. Upon the de-energization of the relay coils, the armatures 93 and 93a move downwardly so that the bridging elements 94 and 94a open the hold circuits and bridge contacts 91 and 92 and 91a and 92a to complete the supply circuits. Current then flows through lead wires 102 and 102a across bridging elements 94 and 94a, and thence through lead wires 104 and 83, and 104a, respectively, to the solenoids in valves 72 and 72a to energize the same. With the valve solenoids energized, the valves open, permitting the working fluid under pressure to be supplied to the clutches which engage to transmit drive to the belt conveyor drive drums. Material thus is conveyed from the receiving bin to the dispensing bin to replenish the same.

With the belt conveyor in operation, material begins to be deposited in the dispensing bin and eventually the level of material rises to a level wherein sufficient pressure is brought to bear against flexible diaphragms 97 and 97a, causing them to flex inwardly, thus closing the contacts in pressure switches 86 and 86a. However, at this point the supply circuit remains energized, in that the interruper circuit is not completed as a result of the gap across contacts 89 and 90 and 89a and 90a in the relays and the open contacts in switches 85 and 85a, thus preventing the relay coils from becoming energized. With additional material being conveyed to the dispensing bin, the level of material therein eventually rises above the level of pressure switches 85 and 85a to provide a lateral force of the material acting on flexible diaphragms 96 and 96a to cause them to flex inwardly, thus closing the contacts in upper pressure switches 85 and 85a. Accordingly, current begins to flow again in the interrupter circuit, thus causing relay coils 95 and 95a to be energized. The armatures 93 and 93a again are attracted upwardly to break the current supply circuit to the valve solenoids and to close the hold circuit. At this point, current flows in both the interrupter and hold circuits and the supply circuit is de-energized. It will be appreciated that the control circuits responsive to the load conditions on either side of the dispensing bin can operate independently of each other to operate either of the belt conveyors 21 or 22.

In the event of failure in the automatic control system, the control can be switched to the manual control system by means of selector switches 81 and 81a. When the control is switched to manual, current flows from the battery 75, lead wire 77, ignition switch 76, lead wire 78, selector switches 81 and 81a and lead wires 83 and 83a to the solenoid valves 72 and 72a to actuate the same.

The emergency warning system of the present invention operates to prevent the level of the material in the dispensing bin to fall to a level even below the level of the lower pressure switches 86 and 86a. In the event that the material in the dispensing bin has become completely depleted, flexible diaphragms 111 and 111a will be caused to move outwardly, thus causing the normally opened contacts in the pressure switches 87 and 87a to close. With the ignition switch 76 in the on position and the contacts in pressure switches 87 and 87a closed, current flows from the battery 75 through lead wire 77, ignition switch 76, lead wires 114 and 118 through the closed contacts in pressure switches 87 and 87a and thence through lead wires 119 and 116 to a horn 117 or any other suitable indicator which is grounded as at 117', to operate the same, thus providing a warning to the operator of the loss of material in the dispensing bin.

It will further be appreciated that in the event of the failure of the automatic control system, the operator by means of selector switches 81 and 81a can operate the supply circuits for either side of the dispensing bin to assure a sufficient supply of material therein.

The vehicle as described not only provides manual and automatic electrical control means for assuring a constant sufficient supply of material in the dispensing bin, and a control means for providing a precise predetermined amount of dispensed material regardless of any variations in speed of the despensing vehicle, but also means for adjusting the width of the strip of dispensed material. Referring particularly to FIGURES 2, 4 and 5, as previously indicated, each of the helical screw shafts 47 is provided at its rearward end with splines 54 which are adapted to register with grooves 53 in each associated sprocket wheel 52. By moving the helical screw shafts axially into and out of operative engagement through the splined connections with the sprocket wheels, the width of the strip of dispensed material can be adjusted accordingly. As shown in FIGURE 5, the helical screw shaft 47 can be pulled outwardly to the position shown by the dotted lines, so that the splines 54 are out of operative engagement with the grooves 53 in the sprocket wheel 52.

To prevent the settling of the material particularly in the lower part of the dispensing bin, thus preventing the free flow of material to the dispensing means, conditioning means are provided for agitating or loosening the material in the lower regions of the bin. The conditioning means comprises a line 121 extending into the dispensing bin connected to a suitable air compressor which provides radial jets of air which loosen the comminuted material, thus preventing the same from settling.

Figure 8:
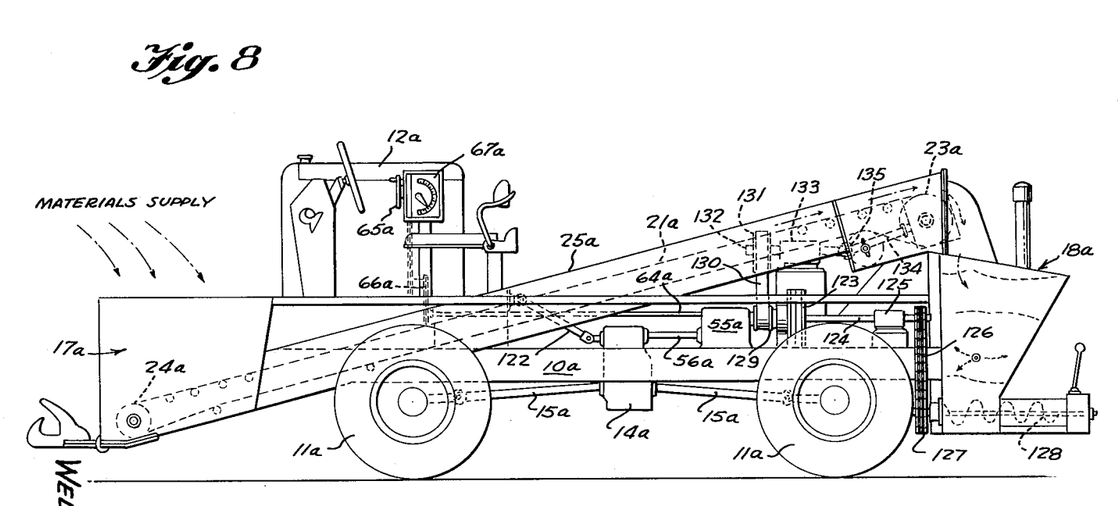
FIGURE 8 is a side view of a second embodiment of the invention.

The second embodiment of the invention as illustrated in FIGURE 8 of the drawings is substantially similar in construction and operation to the above described embodiment except that the drive for the conveyors is coordinated with the drive of the dispensing means. Referring specifically to FIGURE 8, drive is transmitted from the power unit 12a to the transmission 14a by means of a drive transmitting shaft 122. The transmission 14a distributes the drive to each of the wheels 11a by means of drive transmitting shafts 15a. Each of the wheels 11a is driven by separate drive means, as indicated. Output shaft 56a of transmission 142, being geared to the wheel drives, transmits drive from the transmission 14a to the variable speed drive unit 55a. Drive then is transmitted from the variable speed drive unit 55a through a suitable output shaft, a disconnect clutch 123, a shaft 124 journaled in a suitable bearing member 125 and a sprocket chain 126 to a centrally disposed helical screw shaft 127. The lower end of the dispensing container 18a is provided with a plurality of longitudinally extending and transversely spaced helical screw shafts 128, which are provided with drive gears at the forward ends thereof in mesh to provide a continuous gear train transversely across the rearward end of the vehicle. It will be understood, however, that any suitable type of dispensing means can be provided in this particular embodiment.

The drive drums 23a of the conveyors 21a are driven by the output shaft of the variable speed drive unit 55a by means of a drive pulley 129 mounted on the output shaft of the variable speed drive unit, a drive belt 130, a driven pulley 131 mounted on a shaft 132 journaled in a suitable bearing unit 133 and a drive transmitting shaft 134 operatively connected to shaft 132 by means of a universal connection 135.

It will be appreciated that by driving the dispensing means and the conveyors by means of the output from the variable speed drive unit, the drives of the dispensing means and the conveyors will at all times be coordinated. This will provide for material being supplied to the dispensing bin at all times when material is being dispensed therefrom. In addition, the operation of the conveyors and the dispensing means will be coordinated with the speed of the vehicle by means of the variable drive unit being driven through the main transmission 14a. As described in connection with the first embodiment, the input to output ratio of the variable speed drive unit 55a may be preset by the operator by means of a hand wheel 65a. The desired ratio is set into the variable speed drive unit 55a from the hand wheel through sprocket chain 66a and control shaft 64a.

From the foregoing detailed description, it will be evident that there are a number of changes, adaptations, and modifications of the present invention which come within the province of these skilled in the art. However, it is intended that all such variations not departing from the spirit of the invention, be considered as within the scope thereof as limited solely by the appended claims.

What I claim is:

1. A vehicle for dispensing comminuted material and the like comprising a frame mounted on wheels, a power means mounted on the vehicle, a first drive transmitting means for transmitting drive from the power means to the wheels, container means mounted on the vehicle, means for supplying comminuted material to said container means, material dispensing means mounted on the vehicle for receiving material from said container means and dispensing the same, a second drive transmitting means operatively connected to the first drive transmitting means for transmitting coordinated drive from the wheels to the dispensing means, a first control means operatively connected to the second drive transmitting means for varying the speed ratio of the wheel drive to the dispensing rate of the dispensing means, a third drive transmitting means for transmitting drive from the power means to the material supply means and a second control means responsive to predetermined load conditions of the material in the container means operatively connected with the third drive transmitting means for selectively operating the same.

2. An automotive vehicle for dispensing comminuted materials and the like comprising a frame mounted on wheels, a power means mounted on the vehicle, a first drive transmitting means for transmitting drive from the power means to the wheels, a first container mounted on the vehicle, a second container mounted on the vehicle, means for conveying material from the first container to the second container, material dispensing means mounted on the vehicle for receiving material from the second material container and dispensing the same, a second drive transmitting means operatively connected to the first drive transmitting means for transmitting coordinated drive from the wheels to the dispensing means, a first control means operatively connected to the second drive transmitting means for varying the speed ratio of the wheel drive to the dispensing rate of the dispensing means, a third drive transmitting means for transmitting drive from the power means to the conveyor means and a second control means responsive to predetermined load conditions of the material in the second container operatively connected with the third drive transmitting means for selectively operating the same.

3. An automotive vehicle for dispensing comminuted materials and the like comprising a frame mounted on wheels, a power means mounted on the vehicle, a main transmission means mounted on the vehicle, a first means for transmitting drive from the power means to the main transmission means, a second means for transmitting drive from the main transmission means to the wheels, a first material container mounted on the vehicle at one end thereof, a second material container mounted on the vehicle at the opposite end thereof, means mounted on the vehicle for conveying material from the first material container to the second material container, a variable speed drive means mounted on the vehicle, a third means for transmitting drive coordinated with the wheel drives from the main transmission means to the variable speed drive means, material dispensing means mounted on the vehicle for receiving the material from the second material container and dispensing the same, fourth means for transmitting drive from the variable speed drive means to the dispensing means, first control means mounted on the vehicle for regulating the speed ratio of the variable speed drive means, means for driving the conveyor means, the conveyor driving means having a clutch means for selectively transmitting drive to the conveyor means, a second control means responsive to predetermined load conditions of the material in the second material container for selectively actuating the clutch means to transmit drive to the conveyor means to operate the same.

4. An automotive vehicle for dispensing comminuted material and the like according to claim 3 wherein the second control means is operatively responsive to the first predetermined level of material in the second container to engage the clutch means and to a second predetermined level of the material in the second container to disengage the clutch means.

5. An automotive vehicle for dispensing comminuted materials and the like comprising a frame mounted on wheels, a power means mounted on the vehicle, a main transmission means mounted on the vehicle, a first means for transmitting drive from the power means to the main transmission means, second means for transmitting drive from the main transmission means to the wheels, first and second material containers mounted on the vehicle, means mounted on the vehicle for conveying material from the first material container to the second material container, a variable speed drive means mounted on the vehicle, a third means for transmitting drive coordinated with the wheel drives from the main transmission means to the variable speed drive means, a material dispensing means mounted on the vehicle for receiving the material from the second material container and dispensing the same, a fourth means for transmitting drive from the variable speed drive means to the dispensing means, first control means mounted on the vehicle for regulating the speed ratio of the variable speed drive means, means for driving the conveyor means, the conveyor driving means having a fluid actuated clutch means for selectively transmitting drive to the conveyor means, a fluid means for actuating the fluid clutch means and an electrical control means responsive to the load conditions of the material in the second material container for selectively operating the fluid means to actuate the fluid clutch means thus transmitting drive to the conveyor driving means to operate the same.

6. An automotive vehicle for dispensing comminuted material and the like according to claim 5, wherein the fluid means comprises a source of fluid under pressure, means for supplying the fluid to the fluid clutch means to actuate the same, electrically actuated valve means for controlling the supply of fluid to the fluid clutch means and wherein the electrical control means comprises a current source, current supply circuit means for energizing the electrically actuated valve means, an interrupter circuit means for selectively interrupting the current supply circuit means responsive to the loading of material in the second container at a first predetermined level, and a hold circuit means for maintaining the interruption of the circuit supply circuit means responsive to the energization of the interrupter circuit means and the loading of material in the second container at a second predetermined level lower than the first predetermined level.

7. An automotive vehicle for dispensing comminuted material and the like according to claim 5, wherein the fluid means comprises a source of fluid under pressure, means for supplying the fluid to the fluid clutch means to actuate the same, electrically actuated valve means for controlling the supply of fluid to the fluid clutch means and wherein the electrical control means comprises a current source, first and second current supply circuit means for energizing the electrically actuated valve means, switching means for selectively energizing the first and second current supply circuit means, an interrupter circuit means for selectively interrupting the second current supply circuit means responsive to the loading of material in the second container at a first predetermined level and a hold circuit means for maintaining the interruption of the second supply circuit means responsive to the energization of the interrupter circuit means and the loading of material in the second container at a second predetermined level lower than the first predetermined level.

8. An automotive vehicle for dispensing comminuted materials and the like according to claim 5, wherein the dispensing means comprise a plurality of helical screws having axially adjustable shafts journaled in the vehicle and each helical screw shaft being operatively connected with the fourth drive transmitting means by means of a splined connection.

9. An automotive vehicle for dispensing comminuted materials and the like according to claim 5, having an emergency alarm means responsive to the depletion of material in the second container comprising a current source, an electrically operated indicator means, a current supply circuit means for energizing the indicator means and the current supply circuit means having at least one pressure responsive circuit breaker means mounted on the second container at a level adjacent the dispensing means.

10. An automotive vehicle for dispensing comminuted material and the like according to claim 5, having a means for conditioning the material in the second container comprising a compressed air source and means for supplying and distributing jets of the compressed air in the lower region of the second container to loosen the material.

11. An automotive vehicle for dispensing comminuted materials and the like according to claim 5, wherein the fluid means comprises a source of fluid under pressure, means for supplying the fluid to the fluid clutch means to actuate the same, electrically actuated valve means for controlling the supply of fluid to the fluid clutch means and wherein the electrical control means comprises a current source, an ignition switch having three poles, at least one selector switch having three poles, a relay having first and second pairs of contacts, an armature having a bridging element for alternately bridging the pairs of contacts and an induction coil for attracting the armature, first, second and third pressure responsive circuit breakers each comprising a stationary contact and a movable contact connected to a flexible diaphragm mounted on the second container so that the flexible diaphragm is responsive to the lateral component of force of the weight of the material in the second container, the first circuit breaker being mounted at a first predetermined level of the container adjacent the top thereof and having its contacts normally closed when there is a force exerted thereon, the second circuit breaker being mounted at a second predetermined level lower than the first predetermined level and having its contacts normally closed when there is a force exerted thereon, the third circuit breaker being mounted at a third predetermined level lower than the second circuit breaker and adjacent the dispensing means and having its contacts normally opened when there is a force exerted thereon, an electrically operated indicator means, circuit means coupling the current source to a first pole of the ignition switch, circuit means coupling a second pole on the ignition switch to a first pole on the selector switch, circuit means coupling a second pole of the selector switch with a terminal of the electrically operated valve means having a grounded terminal to complete a first current supply circuit therefor, circuit means including the first pair of relay contacts in series coupling a third pole of the selector switch to the first mentioned terminal of the valve means to complete a second current supply circuit when the bridging element of the relay armature bridges the first pair of relay contacts, a circuit means including the first circuit breaker coupling the third pole of the selector switch to a terminal of the relay coil, the other terminal of the relay coil being grounded to complete a current supply interrupter circuit which energizes the relay coil to induce the armature to cause the bridging element to bridge the first pair of relay contacts when the contacts of the first circuit breaker are closed, circuit means including a second circuit breaker and the second pair of relay contacts in series coupling the third pole of the selector switch with the first mentioned terminal of the relay coil to complete a hold circuit for the interrupter circuit at least when the second circuit breaker is closed and circuit means having the third circuit breaker connected in series coupling a third pole of the ignition switch to the indicator means having a grounded terminal to complete a warning circuit when the third circuit breaker is opened.

12. A vehicle for dispensing comminuted materials and the like comprising a frame mounted on wheels, a power means mounted on the vehicle, a first drive transmitting means for transmitting drive from the power means to the wheels, container means mounted on the vehicle, means for supplying comminuted material to the container means, material dispensing means mounted on the vehicle for receiving material from the container means and dispensing the same, a second drive transmitting means operatively connected to the first drive transmitting means for transmitting cordinated drive from the wheels of the dispensing means, a first control means operatively connected to the second drive transmitting means for varying the speed ratio of the wheel drive to the dispensing rate of the dispensing means, a third drive transmitting means operatively connected to said second drive transmitting means for transmitting drive from said secod drive transmitting means to the material supply means and a second control means responsive to predetermined load conditions of the material in the container means operatively connected with the third drive transmitting means for selectively operating the same.

13. An automotive vehicle for dispensing comminuted materials and the like comprising a frame mounted on wheels, a power means mounted on the vehicle, a first drive transmitting means for transmitting drive from the power means to the wheels, a first container mounted on the vehicle, a second container mounted on the vehicle, means for conveying material from said first container to the second container, material dispensing means mounted on the vehicle for receiving material from the second material container and dispensing the same, a second drive transmitting means operatively connected to the first drive transmitting means for transmitting coordinated drive from the wheels to the dispensing means, a first control means operatively connected to the second drive transmitting means for varying the speed ratio of the wheel drive to the dispensing rate of dispensing means, a third drive transmitting means for transmitting drive from the second drive transmitting means to the conveyor means and second control means responsive to predetermined load conditions of the material in the second container operatively connected with the third drive transmitting means for selectively operating the same.

14. An automotive vehicle for dispensing comminuted materials and the like comprising a frame mounted on wheels, a power means mounted on the vehicle, a main transmission means mounted on the vehicle, a first means for transmitting drive from the power means to the main transmission means, a second means for transmitting drive from the main transmission means to the wheels, a first material container mounted on the vehicle at one end thereof, a second material container mounted on the vehicle at the opposite end thereof, means mounted on the vehicle for conveying material from the first material container to the second material container, a variable speed drive means mounted on the vehicle a third means for transmitting drive coordinated with the wheel drives from the main transmission means to the variable speed drive means, material dispensing means mounted on the vehicle for receiving the material from the second container and dispensing the same, fourth means for transmitting drive from the variable speed drive means to the dispensing means, first control means mounted on the vehicle for varying the speed ratio of the variable speed drive means, means for driving the conveyor means operatively connected to said fourth drive transmitting means, the conveyor driving means having a clutch means for selectively transmitting drive to the conveyor means, a second control means responsive to predetermined load conditions of the material in the second material container for selectively actuating the cluch means to transmit drive to the conveyor means to operate the same.

15. An automotive vehicle for dispensing comminuted materials and the like according to claim 14, wherein the second control means is operatively responsive to a first predetermined level of material in the second container to engage the clutch means and to a second predetermined level of the material in the second container to disengage the clutch means.

16. An automotive vehicle for dispensing comminuted materials and the like comprising a frame mounted on wheels, power means mounted on the vehicle, a main transmission means mounted on the vehicle, a first means for transmitting drive from the power means to the main transmission means, a second means for transmitting drive from the main transmission means to the wheels, first and second material containers mounted on the vehicle, means mounted on the vehicle for conveying material from the first material container to the second material container, a variable speed drive means mounted on the vehicle, a third means for transmitting drive coordinated with the wheel drives from the main transmission means to the variable speed drive means, a material dispensing means mounted on the vehicle for receivingg the material from the second material container and dispensing the same, a fourth means for transmitting drive from the variable speed drive means to the dispensing means, a first control means mounted on the vehicle for regulating the speed ratio of the variable speed drive means, means operatively connected to the fourth drive transmitting means for transmitting drive coordinated with the drive transmitted to the dispensing means to the conveyor means, the conveyor driving means having a fluid actuated clutch means for selectively transmitting drive to the conveyor means, a fluid means for actuating the fluid clutch means and an electrical control means responsive to load conditions of the material in the second material container for selectively operating the fluid material means to actuate the fluid cluch means, thus transmitting drive coordinated with the drive of the dispensing means to the conveyor driving means to operate the same.

17. An automotive vehicle for dispensing comminuted materials and the like according to claim 16, wherein the fluid means comprises a source of fluid under pressure, means for supplying the fluid to the fluid clutch means to actuate the same, electrically actuated valve means for controlling the supply of fluid to the fluid clutch means and wherein the electrical control means comprising a current source, current supply circuit means for energizing the electrically actuated valve means, an interrupter circuit means for selectively interrupting the current supply circuit means responsive to the loading of material in the second container at a first predetermined level, and a hold circuit means for maintaining the interruption of the current supply circuit means responsive to the energization of the interrupter circuit means and the loading of material in the second container at a second predetermined level lower than the first predetermined level.

18. An automotive vehicle for dispensing comminuted materials and the like according to claim 16, wherein the fluid means comprises a source of fluid under pressure, means for supplying the fluid to the fluid clutch means to actuate the same, electrically actuated valve means for controlling the supply of fluid to the fluid clutch means and wherein the electrical control means comprising a current source, first and second current supply circuit means for energizing the electrically actuated valve means, switching means for selectively energizing the first and second current supply means, an interrupter circuit means for selectively interrupting the second current supply circuit means responsive to the loading of material in the second container at a first predetermined level and a hold circuit means for maintaining the interruption of the second supply circuit means responsive to the energization of the interrupter circuit means and the loading of material in the second container at a second predetermined level lower than the first predetermined level.

19. An automotive vehicle for dispensing comminuted materials and the like according to claim 16, wherein the dispensing means comprises a plurality of helical screws having axially adjustable shafts journaled in the vehicle and each helical screw shaft is operatively connected with the fourth drive transmitting means.

20. An automotive vehicle for dispensing comminuted materials and the like according to claim 16, having an emergency alarm means responsive to the depletion of material in the second container comprising a current source, an electrically operated indicator means, a current supply circuit means for energizing the indicator means and the current supply circuit means having at least one pressure responsive circuit breaker means mounted on the second container at a level adjacent the dispensing means.

21. An automotive vehicle for dispensing comminuted material and the like according to claim 16, having a means for conditioning the material in the second container comprising a compressed air source and means for supplying and distributing jets of the compressed air in the lower region of the second container to loosen the material.

22. An automotive vehicle for dispensing comminuted material and the like according to claim 16, having a means for conditioning the material in the second container comprising a compressed air source and means for supplying and distributing jets of the compressed air in the lower region of the second container to loosen the material.

23. A material handling apparatus comprising first and second material containers, at least one means for conveying material from the first material container to the second material container, means for driving said conveyor means, said conveyor driving means having a fluid actuated clutch means for selectively transmitting drive to the conveyor means, a source of fluid under pressure, means for supplying the fluid to the fluid clutch means to actuate the same, electrically actuated valve means for controlling the supply of fluid to the clutch means and an electrical control system comprising a current source, current supply circuit means for energizing the electrically actuated valve means, an interrupter circuit means for selectively interrupting the current supply circuit means responsive to the loading of material in the second container at a first predetermined level, and a hold circuit for maintaining the interruption of the current supply circuit means responsive to the energization of the interrupter circuit means and the loading of material in the second container at a second predetermined level lower than the first predetermined level.

24. A material handling apparatus comprising first and second material containers, means for conveying material from the first material container to the second material container, means for driving the conveyor means, the conveyor driving means having a fluid actuated clutch means for selectively transmitting drive to the conveyor means, a source of fluid under pressure, means for supplying the fluid to the fluid clutch means to actuate the same, electrically actuated valve means for controlling the supply of fluid to the clutch means and an electrical control system comprising a current source, first and second current supply circuit means for energizing the electrically actuated valve means, switching means for selectively energizing the first and second current supply circuit means, an interrupter circuit means for selectively interrupting the second current supply circuit means responsive to the loading of material in the second container at a first predetermined level and a hold circuit means for maintaining the interruption of the second supply circuit means responsive to the energization of the interrupter circuit means and the loading of material in the second container at a second predetermined level lower than the first predetermined level.

25. An electrical control system for selectively operating electrical actuating means of a material supply means for a container to maintain a supply of material within the container between predetermined levels comprising a current source, an ignition switch having three poles, at least one selector switch having three poles, a relay having first and second pairs of contacts, an armature having a bridging element for alternately bridging the pairs of contacts and an induction coil for attracting the armature, first, second and third pressure responsive circuit breakers each comprising a stationary contact and a movable contact connected to a flexible diaphragm mounted on the container so that the flexible diaphragm is responsive to the lateral component of force of the weight of the material in the second container, the first circuit breaker being mounted at a first predetermined level of the container adjacent the top thereof and having its contacts normally closed when there is a force exerted thereon, the second circuit breaker being mounted at a second predetermined level lower than the first predetermined level and having its contacts normally closed when there is a force exerted thereon, the third circuit breaker being mounted at a third predetermined level lower than the second circuit breaker and having its contacts normally opened when there is a force exerted thereon, an electrically operated indicator means, circuit means coupling the current source to a first pole of the ignition switch, circuit means coupling a second pole on the ignition switch to a first pole on the selector switch, circuit means coupling a second pole of the selector switch with a terminal of the electrical actuating means having a grounded terminal to complete a first current supply circuit therefor, circuit means including the first pair of relay contacts in series coupling a third pole of the selector switch to the first mentioned terminal of the electrical actuating means to complete a second current supply circuit when the bridging element of the relay armature bridges the first pair of relay contacts, a circuit means including the first circuit breaker coupling the third pole of the selector switch to a terminal of the relay coil, the other terminal of the relay coil being grounded to complete a current supply interrupter circuit which energizes the relay coil to induce the armature to cause the bridging element to bridge the first pair of relay contacts when the contacts of the first circuit breaker are closed, circuit means including a second circuit breaker and the second pair of relay contacts in series coupling the third pole of the selector switch with the first mentioned terminal of the relay coil to complete a hold circuit for the interrupter circuit at least when the second circuit breaker is closed and circuit means having the third circuit breaker connected in series coupling a third pole of the ignition switch to the indicator means having a grounded terminal to complete a warning circuit when the third circuit breaker is opened.

26. An assembly for supplying material to a container responsive to load conditions within the container comprising material supply means, electrical actuating means for selectively operating the material supply means and an electrical control system for selectively energizing the electrical actuating means comprising a current source, an ignition switch having three poles, at least one selector switch having three poles, a relay having first and second pairs of contacts, an armature having a bridging element for alternately bridging the pairs of contacts and an induction coil for attracting the armature, first, second and third pressure responsive circuit breakers each comprising a stationary contact and a movable contact connected to a flexible diaphragm mounted on the container so that the flexible diaphragm is responsive to the lateral component of force of the weight of the material in the second container, the first circuit breaker being mounted at a first predetermined level of the container adjacent the top thereof and having its contacts normally closed when there is a force exerted thereon, the second circuit breaker being mounted at a second predetermined level lower than the first predetermined level and having its contacts normally closed when there is a force exerted thereon, the third circuit breaker being mounted at a third predetermined level lower than the second circuit breaker and having its contacts normally opened when there is a force exerted thereon, an electrically operated indicator means, circuit means coupling the current source to a first pole of the ignition switch, circuit means coupling a second pole on the ignition switch to a first pole on the selector switch, circuit means coupling a second pole of the selector switch with a terminal of the electrical actuating means having a grounded terminal to complete a first current supply circuit therefor, circuit means including the first pair of relay contacts in series coupling a third pole of the selector switch to the first mentioned terminal of the electrical actuating means to complete a second current supply circuit when the bridging element of the relay armature bridges the first pair of relay contacts, a circuit means including the first circuit breaker coupling the third pole of the selector switch to a terminal of the relay coil, the other terminal of the relay coil being grounded to complete a current supply interrupter circuit which energizes the relay coil to induce the armature to cause the bridging element to bridge the first pair of relay contacts when the contacts of the first circuit breaker are closed, circuit means including a second circuit breaker and the second pair of relay contacts in series coupling the third pole of the selector switch with the first mentioned terminal of the relay coil to complete a hold circuit for the interrupter circuit at least when the second circuit breaker is closed and circuit means having the third circuit breaker connected in series coupling a third pole of the ignition switch to the indicator means having a grounded terminal to complete a warning circuit when the third circuit breaker is opened.

27. A material handling apparatus comprising first and second material containers, means for conveying material from the first material container to the second material container, means for driving the conveyor means, the conveyor driving means having fluid actuated clutch means for selectively transmitting drive to the conveyor means, a source of fluid under pressure, means for supplying fluid to the fluid clutch means to actuate the same, electrically actuated valve means for controlling the supply of fluid to the clutch means and an electrical control system comprising a current source, an ignition switch having three poles, at least one selector switch having three poles, a relay having first and second pairs of contacts, an armature having a bridging element for alternately bridging the pairs of contacts and an induction coil for attracting the armature, first, second and third pressure responsive circuit breakers each comprising a stationary contact and a movable contact connected to a flexible diaphragm mounted on the second container so that the flexible diaphragm is responsive to the lateral component of force of the weight of the material in the second container, the first circuit breaker being mounted at a first predetermined level of the container adjacent the top thereof and having its contacts normally closed when there is a force exerted thereon, the second circuit breaker being mounted at a second predetermined level lower than the first predetermined level and having its contacts normally closed when there is a force exerted thereon, the third circuit breaker being mounted at a third predetermined level lower than the second circuit breaker and having its contacts normally opened when there is a force exerted thereon, an electrically operated indicator means, circuit means coupling the current source to a first pole of the ignition switch, circuit means coupling a second pole on the ignition switch to a first pole on the selector switch, circuit means coupling a second pole of the selector switch with a terminal of the electrically operated valve means having a grounded terminal to complete a first current supply circuit therefor, circuit means including the first pair of relay contacts in series coupling a third pole of the selector switch to the first mentioned terminal of the valve means to complete a second current supply circuit when the bridging element of the relay armature bridges the first pair of relay contacts, a circuit means including the first circuit breaker coupling the third pole of the selector switch to a terminal of the relay coil, the other terminal of the relay coil being grounded to complete a current supply interrupter circuit which energizes the relay coil to induce the armature to cause the bridging element to bridge the first pair of relay contacts when the contacts of the first circuit breaker are closed, circuit means including a second circuit breaker and the second pair of relay contacts in series coupling the third pole of the selector switch with the first mentioned terminal of the relay coil to complete a hold circuit for the interrupter circuit at least when the second circuit breaker is closed and circuit means having the third circuit breaker connected in series coupling a third pole of the ignition switch to the indicator means having a grounded terminal to complete a warning circuit when the third circuit breaker is opened.

28. A material handling apparatus comprising first and second material containers, means for conveying material from the first material container to the second material container, means for driving the conveyor means, the conveyor driving means having a fluid actuated clutch means for selectively transmitting drive to the conveyor means, a source of fluid under pressure, means for supplying the fluid to the fluid clutch means to actuate the same, electrically actuated valve means for controlling the supply of fluid to the clutch means and an electrical control system comprising a current source and an electrical circuit having means responsive to a first predetermined level of material in the second container to energize the electrically actuated valve means and to a second predetermined level of the material in the second container to de-energize the electrically actuated valve means.

References Cited by the Examiner
UNITED STATES PATENTS

| | | | |
|---|---|---|---|
| 2,116,778 | 5/38 | Brayer | 222—76 X |
| 3,133,726 | 5/64 | Tarukawa | 222—56 X |

FOREIGN PATENTS 801,304  9/58  Great Britain.

LOUIS J. DEMBO, *Primary Examiner.*
HADD S. LANE, *Examiner.*